(12) United States Patent
Tomiuga

(10) Patent No.: US 9,604,694 B2
(45) Date of Patent: Mar. 28, 2017

(54) HYDRAULIC SHOCK ABSORBER AND METHOD FOR INJECTING OPERATING LIQUID INTO HYDRAULIC SHOCK ABSORBER

(71) Applicant: KAYABA INDUSTRY CO., LTD., Tokyo (JP)

(72) Inventor: Takeshi Tomiuga, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/779,371

(22) PCT Filed: Mar. 26, 2014

(86) PCT No.: PCT/JP2014/058600
§ 371 (c)(1),
(2) Date: Sep. 23, 2015

(87) PCT Pub. No.: WO2014/157370
PCT Pub. Date: Oct. 2, 2014

(65) Prior Publication Data
US 2016/0046349 A1 Feb. 18, 2016

(30) Foreign Application Priority Data
Mar. 28, 2013 (JP) ................................ 2013-068445

(51) Int. Cl.
*B62K 25/08* (2006.01)
*F16F 9/43* (2006.01)
(Continued)

(52) U.S. Cl.
CPC .............. *B62K 25/08* (2013.01); *B60G 13/08* (2013.01); *F16F 9/43* (2013.01); *F16F 9/432* (2013.01);
(Continued)

(58) Field of Classification Search
CPC ........ B62K 25/04; B62K 25/06; B62K 25/08; B62K 2025/044; B62K 2025/048; B60G 2202/24; F16F 9/432; F16F 9/435
(Continued)

(56) References Cited

U.S. PATENT DOCUMENTS 4,044,866 A * 8/1977 Ishida ..................... F16F 9/432
188/322.17
4,131,139 A * 12/1978 Tanabe .................... F16F 9/432
139/384 B
(Continued)

FOREIGN PATENT DOCUMENTS

GB        2348473 A * 10/2000 ................ F16F 9/06
JP    2010-185571 A    8/2010
(Continued)

*Primary Examiner* — Thomas J Williams
(74) *Attorney, Agent, or Firm* — Rabin & Berdo, P.C.

(57) ABSTRACT

A hydraulic shock absorber includes a cylinder connected to a wheel side, a liquid chamber formed in the cylinder and filled with an operating liquid, an annular rod guide fixed to the cylinder and closing a vehicle body side of the liquid chamber, a piston rod connected to the vehicle body side, penetrating a shaft core part of the rod guide, and going into/out of the cylinder, a piston held by the piston rod and dividing the liquid chamber into an extension-side chamber and a compression-side chamber, and an annular bush fitted in an inner periphery of the rod guide and pivotally supporting the piston rod, movably in an axial direction, in which the piston rod includes a columnar sliding shaft portion in sliding contact with the bush and a first injection portion for injecting the operating liquid provided on a side opposite to the piston of the sliding shaft portion and outside a range of a damper stroke.

5 Claims, 4 Drawing Sheets

(51) Int. Cl.
   *B60G 13/08* (2006.01)
   *B62K 25/04* (2006.01)
(52) U.S. Cl.
   CPC .......... *F16F 9/435* (2013.01); *B60G 2202/24* (2013.01); *B62K 2025/048* (2013.01)
(58) Field of Classification Search
   USPC ...... 188/297, 302, 313, 314, 322.17, 322.22
   See application file for complete search history.

(56) References Cited

U.S. PATENT DOCUMENTS

| | | | | |
|---|---|---|---|---|
| 5,720,473 | A * | 2/1998 | Thomas | B60G 15/062 188/312 |
| 2010/0207350 | A1* | 8/2010 | Uchiyama | B62K 25/08 280/276 |
| 2012/0187651 | A1* | 7/2012 | Wimmer | B62K 25/08 280/276 |
| 2015/0184715 | A1* | 7/2015 | Tomiuga | B62K 25/04 188/297 |

FOREIGN PATENT DOCUMENTS

| | | |
|---|---|---|
| JP | 2011-174501 A | 9/2011 |
| JP | 2012-167785 A | 9/2012 |

\* cited by examiner

HYDRAULIC SHOCK ABSORBER AND METHOD FOR INJECTING OPERATING LIQUID INTO HYDRAULIC SHOCK ABSORBER

TECHNICAL FIELD

The present invention relates to a hydraulic shock absorber and a method for injecting an operating liquid into a hydraulic shock absorber.

BACKGROUND ART

In general, a shock absorber is to damp vibration of a vehicle, equipment, a construction and the like. A hydraulic shock absorber generating a damping force using resistance of an operating liquid made of oil, water, an aqueous solution or the like includes a cylinder in which the operating liquid is filled therein and a liquid chamber is formed, an annular rod guide fixed to the cylinder and closing one side of the liquid chamber, a piston rod penetrating the rod guide and going into/out of the cylinder, a piston held by the piston rod and dividing the liquid chamber into an extension-side chamber and a compression-side chamber, a piston passage formed in the piston and allowing the extension-side chamber and the compression-side chamber to communicate with each other, and a damping valve giving resistance to a flow of the operating fluid passing through the piston passage.

The above-described hydraulic shock absorber is configured such that, in extension/contraction of the piston rod going into/out of the cylinder, the operating liquid in one of the chambers pressurized by the piston passes through the piston passage and moves to the other chamber, whereby the damping force caused by the resistance of the damping valve is generated (see JP2011-174501A, JP2012-167785A, JP2010-185571A, for example).

SUMMARY OF INVENTION

When the above-described hydraulic shock absorber is used for a saddle type vehicle such as a bicycle, a tricycle and the like, it generally includes a telescopic type shock absorber body composed of an outer tube and an inner tube going into/out of the outer tube and forming an outer shell of the hydraulic shock absorber. In such a hydraulic shock absorber, if the cylinder is assembled to the shock absorber body after the operating liquid is sealed in the liquid chamber, the number of components and the number of assembling processes increase. Thus, it is preferable that the operating liquid is injected into the liquid chamber after the cylinder is assembled to the shock absorber body. However, in an upright hydraulic shock absorber in which the cylinder is connected to a wheel side as disclosed in JP2012-167785A, since an opening on a vehicle body side of the cylinder is closed by the rod guide, it is difficult to inject the operating liquid from the vehicle body side into the cylinder.

Moreover, in a liquid-chamber pressurization type hydraulic shock absorber including a free piston in sliding contact with an inner peripheral surface of the cylinder and closing a side of the liquid chamber opposite to the rod guide and urging means for urging the free piston to the liquid chamber side as disclosed in JP2010-185571A, a seal member in sliding contact with an outer peripheral surface of the piston rod is provided on an inner periphery of the rod guide. Therefore, if this type of hydraulic shock absorber is made the upright type, injection of the operating liquid from the vehicle body side becomes difficult, and injection of the operating liquid from the wheel side also becomes difficult.

The present invention has an object to realize easy injection of the operating liquid into the cylinder after the cylinder is assembled to the shock absorber body.

According to an aspect of the present invention, a hydraulic shock absorber interposed between a vehicle body and a wheel, includes a cylinder connected to the wheel side, a liquid chamber formed in the cylinder, the liquid chamber being filled with an operating liquid, an annular rod guide fixed to the cylinder, the rod guide closing the vehicle body side of the liquid chamber, a piston rod connected to the vehicle body side, the piston rod penetrating a shaft core part of the rod guide, the piston rod going into/out of the cylinder, a piston held by the piston rod, the piston dividing the liquid chamber into an extension-side chamber and a compression-side chamber, and an annular bush fitted in an inner periphery of the rod guide, the bush pivotally supporting the piston rod movably in an axial direction, wherein the piston rod includes, a columnar sliding shaft portion contacting slidably with the bush, and a first injection portion configured to inject the operating liquid, the first injection portion being provided on a side opposite to the piston of the sliding shaft portion and outside a range of a damper stroke.

According to another aspect of the present invention, a method for injecting an operating liquid to a hydraulic shock absorber, the hydraulic shock absorber being interposed between a vehicle body and a wheel, the hydraulic shock absorber includes a cylinder connected to the wheel side, a liquid chamber formed in the cylinder, the liquid chamber being filled with an operating liquid, an annular rod guide fixed to the cylinder, the rod guide closing the vehicle body side of the liquid chamber, a piston rod connected to the vehicle body side, the piston rod penetrating a shaft core part of the rod guide, the piston rod going into/out of the cylinder, a piston held by the piston rod, the piston dividing the liquid chamber into an extension-side chamber and a compression-side chamber, an annular bush fitted in an inner periphery of the rod guide, the bush pivotally supporting the piston rod movably in an axial direction, a free piston contacting slidably with an inner peripheral surface of the cylinder, the free piston closing the wheel side of the liquid chamber, and an annular seal member held on an inner periphery of the rod guide closer to the cylinder side than the bush, the seal member contacting slidably with an outer peripheral surface of the sliding shaft portion, wherein the piston rod stands on the vehicle body side of the piston, the piston rod includes a columnar sliding shaft portion contacting slidably with the bush, a first injection portion configured to inject the operating liquid, the first injection portion being provided on a side opposite to the piston of the sliding shaft portion and outside a range of a damper stroke, and a second injection portion configured to inject the operating liquid, the second injection portion being provided on the piston side of the sliding shaft portion, wherein after the operating liquid is injected into the cylinder through a gap formed between the first injection portion and the seal member by facing the first injection portion with the seal member, the piston rod is retracted from the cylinder, and the operating liquid is injected into the cylinder through a gap formed between the second injection portion and the seal member by facing the second injection portion with the seal member.

DESCRIPTION OF EMBODIMENTS

An embodiment of the present invention will be explained below by referring to the attached drawings.

Figure 1:
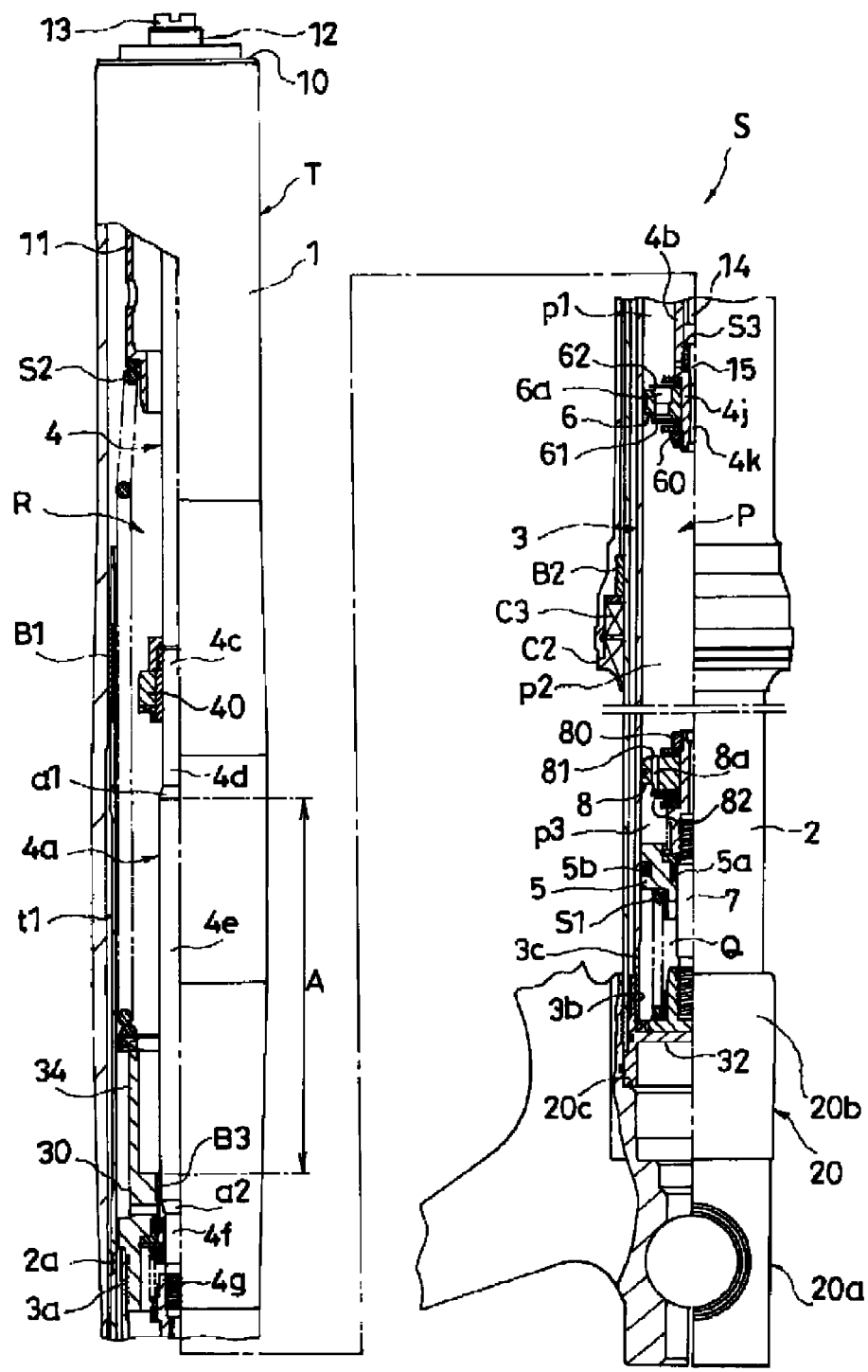
FIG. 1 is a partial sectional view of a hydraulic shock absorber according to an embodiment of the present invention.

A hydraulic shock absorber S is interposed between a vehicle body and a wheel. The hydraulic shock absorber S includes, as illustrated in FIG. 1, a cylinder 3 connected to a wheel side, a liquid chamber P formed in the cylinder 3 and filled with an operating oil as an operating liquid, an annular rod guide 30 fixed to the cylinder 3 and closing a vehicle body side of the liquid chamber P, a piston rod 4 connected to the vehicle body side, penetrating a shaft core part of the rod guide 30 and going into/out of the cylinder 3, a piston 6 held by the piston rod 4 and dividing the liquid chamber P into an extension-side chamber p1 and a compression-side chamber p2, and an annular bush B3 fitted in an inner periphery of the rod guide 30 and pivotally supporting the piston rod 4, movably in an axial direction. The piston rod 4 includes a columnar sliding shaft portion 4e in sliding contact with the bush B3 and a first injection portion 4d for injecting the operating oil provided on a side of the sliding shaft portion 4e opposite to the piston and outside a range A of a damper stroke.

The hydraulic shock absorber S is used for a front fork suspending a front wheel in a saddle type vehicle such as a bicycle, a tricycle and the like. The front fork includes, though not illustrated in detail, a pair of hydraulic shock absorbers S standing on both sides of the front wheel (only one of the hydraulic shock absorbers S is shown in FIG. 1), a vehicle-body side bracket connected to a vehicle body frame which connects the pair of hydraulic shock absorbers S and becomes a frame of the vehicle body, and a wheel-side bracket 20 connecting the pair of hydraulic shock absorbers S to an axle of the front wheel, respectively. The hydraulic shock absorber S may be used for those other than the front fork or may be used for a rear cushion suspending a rear wheel in a saddle type vehicle or in a vehicle other than the saddle type vehicles.

Detailed explanation will be given below. The hydraulic shock absorber S is a liquid chamber pressurization type shock absorber including a telescopic type body T having an outer tube 1 and an inner tube 2 going into/out of the outer tube 1, the cylinder 3 standing on a shaft core part of the body T, the annular rod guide 30 mounted on a vehicle-body side opening end portion 3a of the cylinder 3, the piston rod 4 supported by the rod guide 30 and going into/out of the cylinder 3, the piston 6 held at a distal end portion of the piston rod 4 and provided movably in an axial direction in the cylinder 3 while in sliding contact with an inner peripheral surface of the cylinder 3, a base rod 7 standing on the shaft core part of the cylinder 3 on a side opposite to the piston rod 4, a base member 8 held at a distal end portion of the base rod 7, a free piston 5 formed annularly and provided movably in the axial direction in the cylinder 3 while in sliding contact with an outer peripheral surface of the base rod 7 and the inner peripheral surface of the cylinder 3, and urging means S1 for urging the free piston 5 to an upper side in FIG. 1.

Between the body T and the cylinder 3, a reservoir R is formed. In the reservoir R, the operating oil is stored, and a gas is accommodated on an upper side through an oil surface of the operating oil. Moreover, in the inner tube 2, a communication hole 2a is formed. As a result, the operating oil can freely move between a cylindrical gap t1 formed between the outer tube 1 and the inner tube 2 and the reservoir R.

In the cylinder 3, the liquid chamber P divided by the rod guide 30 from the reservoir R and a rear surface chamber Q divided by the free piston 5 from the liquid chamber P and accommodating the urging means S1 are formed. In the liquid chamber P and the rear surface chamber Q, the operating oil is filled. The liquid chamber P is constituted by the extension-side chamber p1 and the compression-side chamber p2 divided by the piston 6 and a liquid reservoir chamber p3 divided by the base member 8 from the compression-side chamber p2.

The body T constitutes an outer shell of the hydraulic shock absorber S, and the vehicle-body side bracket is fixed to the outer tube 1, and the wheel-side bracket 20 is fixed to the inner tube 2. Thus, the body T is configured such that, when an impact caused by irregularity on a road surface is inputted into a wheel, the inner tube 2 goes into/out of the outer tube 1 and extends/contracts.

The upper side in FIG. 1 of the body T is closed by a cap member 10 screwed with an inner periphery of an end portion of the outer tube 1, while a lower side in FIG. 1 is closed by the wheel-side bracket 20 screwed with an outer periphery of an end portion of the inner tube 2. Moreover, the lower side in FIG. 1 of the cylindrical gap t1 is closed by an annular dust seal C2 and oil seal C3 held by the inner periphery of the outer tube 1 and in sliding contact with an outer peripheral surface of the inner tube 2. As a result, the operating oil or gas stored in the body T does not leak to an outside air side.

In this embodiment, the front fork is set to an inverted type in which the outer tube 1 is connected to the vehicle body side, and the inner tube 2 is connected to the wheel side, but it may be an upright type in which the outer tube 1 is connected to the wheel side and the inner tube 2 is connected to the vehicle body side.

In the body T, a suspension spring S2 made of a coil spring is accommodated. The suspension spring S2 urges the body T in an extension direction and elastically supports the vehicle body. The suspension spring S2 has its lower end in FIG. 1 supported by a cylindrical oil lock case 34 standing on the rod guide 30 and its upper end in FIG. 1 supported by a cylindrical spring receiver 11.

The spring receiver 11 can be driven vertically in FIG. 1 by an adjuster 12 mounted on the cap member 10 and for adjusting a reaction force, whereby a reaction force of the suspension spring S2 can be adjusted. In this embodiment, the suspension spring S2 is a coil spring but it may be an air spring. Moreover, the suspension spring S2 does not have to be accommodated in the body T.

In the cylindrical gap t1, a pair of bushes B1 and B2 pivotally supporting the inner tube 2 capable of going into/out of the outer tube 1 are arranged. Since the operating oil is stored in the cylindrical gap t1 and also is supplied thereto from the communication hole 2a of the inner tube 2, sliding surfaces of the bushes B1 and B2 can be lubricated by the operating oil.

The cylinder 3 standing on the shaft core part of the body T is connected to the wheel side. The wheel-side bracket 20 includes a connection portion 20a connected to the axle and a cylindrical portion 20b standing from the connection portion 20a. On an inner periphery of the cylindrical portion 20b, a stepped surface 20c is formed, whereby a bottom member 32 having a cylindrical shape with a bottom is positioned. The cylinder 3 is screwed with an inner periphery of the bottom member 32.

The bottom member 32 is pressed onto the stepped surface 20c at a distal end of the inner tube 2 screwed with the inner periphery of the cylindrical portion 20b and is fixed to the vehicle-body side bracket 20. Therefore, the cylinder 3 is connected to the wheel side through the bottom member 32 and the wheel-side bracket 20 and stands on the shaft core part of the inner tube 2. On the lower end portion in FIG. 1 of the cylinder 3, a large inner-diameter portion 3b having an inner diameter larger than the other portions is formed, and a communication hole 3c penetrating the large inner-diameter portion 3b is formed.

The rod guide 30 is mounted on the vehicle-body side opening end portion 3a of the cylinder 3 and closes the vehicle body side of the liquid chamber P. The rod guide 30 is annular and includes an insertion portion 30a inserted into the cylinder 3 and screwed with the inner periphery of the cylinder 3, a protrusion portion 30b continuing to the insertion portion 30a and protruding from the cylinder 3, and an annular flange portion 30c extending to an outer periphery from the protrusion portion 30b as illustrated in FIG. 2.

Figure 2:
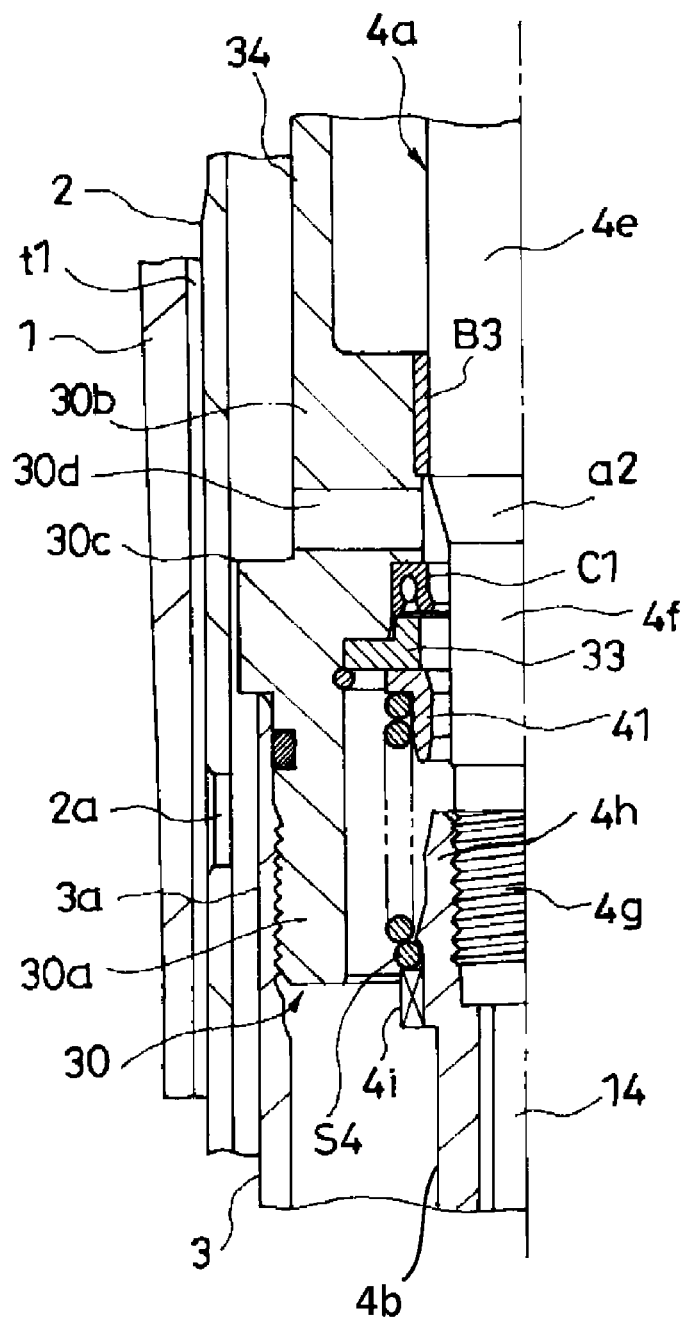
FIG. 2 is a partial enlarged view of the hydraulic shock absorber according to the embodiment of the present invention.

On an upper side than the flange portion 30c of the protrusion portion 30b in FIG. 2, a lateral hole 30d penetrating in a radial direction is formed. On an inner periphery of the rod guide 30 and an upper side in FIG. 2 than the lateral hole 30d, the annular bush B3 is fitted, while on a lower side than the lateral hole 30d, an annular seal member C1 and a stopper 33 are held by being juxtaposed vertically.

On an upper side in FIG. 2 of the protrusion portion 30b, the cylindrical oil lock case 34 stands. The oil lock case 34 constitutes an oil lock mechanism together with an oil lock piece 40 (see FIG. 1) mounted on an outer periphery of the piston rod 4 and alleviates an impact when the hydraulic shock absorber S is compressed to the most.

The piston rod 4 is held by the cap member 10 in a suspended state as illustrated in FIG. 1 and is connected to the vehicle body side through the cap member 10, the outer tube 1, and the vehicle-body side bracket. The lower side in FIG. 1 of the piston rod 4 penetrates the shaft core part of the rod guide 30 and is pivotally supported by the bush B3, movably in the axial direction. The piston rod 4 has a cylindrical shaft member 4a pivotally supported by the bush B3 and an annular center rod 4b holding the piston 6.

The shaft member 4a includes a columnar sliding shaft portion 4e in sliding contact with the bush B3, a first injection portion 4d continuing coaxially to the upper side in FIG. 1 of the sliding shaft portion 4e and having an outer diameter formed smaller than an outer diameter of the sliding shaft portion 4e, a mounting portion 4c continuing coaxially to the upper side in FIG. 1 of the first injection portion 4d and to which the oil lock piece 40 is mounted on an outer periphery thereof, a second injection portion 4f continuing to the lower side in FIG. 1 of the sliding shaft portion 4e and having an outer diameter formed smaller than the outer diameter of the sliding shaft portion 4e, and a screw portion 4g continuing to the lower side in FIG. 1 of the second injection portion 4f and with which a center rod 4b is screwed on an outer periphery thereof. The first injection portion 4d and the second injection portion 4f include conical slope portions a1 and a2 with diameters of outer peripheries gradually reduced from an end portion on the sliding shaft portion 4e side to a side opposite to the sliding shaft portion 4e.

In a normal operation in which the hydraulic shock absorber S is interposed between the vehicle body and the wheel and extended/contracted (hereinafter referred to as in operation), a range in which the piston rod 4 goes into/out of the cylinder 3 is assumed to be a damper stroke range A, while an outside of the bush B as outside of the cylinder 3.

The piston rod 4 in this embodiment is set such that the sliding shaft portion 4e in the shaft member 4a is within the damper stroke range A, while the other portions are outside of the damper stroke range A. The damper stroke range A can be changed as appropriate, and it may be so configured that a part of the second injection portion 4f is within the damper stroke range A.

In the operation of the hydraulic shock absorber S in which the piston rod 4 moves within the damper stroke range A, when the piston rod 4 retreats from the cylinder 3 by a predetermined amount, the second injection portion 4f is configured to be faced with the seal member C1. If the seal member C1 is faced with the sliding shaft portion 4e of the piston rod 4, the seal member C1 is in sliding contact with the sliding shaft portion 4e, and thus, no gap is formed in an inner periphery of the seal member C1. Then, when the seal member C1 is faced with the second injection portion 4f, a gap is formed in the inner periphery of the seal member C1.

According to the above-described configuration, in the operation of the hydraulic shock absorber S, within a predetermined stroke range from when the piston rod 4 retreats from the cylinder 3 by a predetermined amount and the second injection portion 4f reaches the seal member C1 until the piston rod 4 retreats from the cylinder 3 to the most and the hydraulic shock absorber S extends to the maximum, a gap is formed between the seal member C1 and the piston rod 4. As a result, the operating oil in the cylinder 3 can be made to escape to the outside of the cylinder 3, that is, to be relieved through the gap and the lateral hole 30d of the rod guide 30.

Moreover, in this embodiment, when an occupant gets off the vehicle and the hydraulic shock absorber S extends, the second injection portion 4f is configured to be faced with the seal member C1. Thus, during parking of the vehicle when only a vehicle-body load is applied to the hydraulic shock absorber S, the operating oil in the cylinder 3 can be made to escape to the outside of the cylinder 3.

The center rod 4b includes, as illustrated in FIG. 2, a nut portion 4h screwed with the screw portion 4g, a seat portion 4i extending from the nut portion 4h to an outer periphery, and a holding portion 4j continuing to a lower side in FIG. 2 of the nut portion 4h and holding the piston 6 (see FIG. 1). Moreover, in the center rod 4b, a bypass path 4k bypassing the piston passage 6a formed in the piston 6 and allowing the extension-side chamber p1 and the compression-side chamber p2 to communicate with each other is formed as illustrated in FIG. 1.

Into the shaft member 4a of the piston rod 4 formed cylindrically, a pushrod 14 is inserted. The pushrod 14 is driven in an axial direction by an adjuster 13 for adjusting a damping force, mounted on the cap member 10.

In the center rod 4b, a needle valve 15 narrowing the bypass path 4k and an urging spring S3 for urging the needle valve 15 to the pushrod 14 side are accommodated. By operating the adjuster 13 so as to drive the pushrod 14 and by pushing the needle valve 15 into the bypass path 4k, a channel area of the bypass path 4k can be narrowed. To the contrary, by retreating the needle valve 15 from the bypass path 4k, the channel area of the bypass path 4k can be widened.

On an outer periphery of the piston rod 4, a rebound member for absorbing an impact when the hydraulic shock absorber S extends to the most is mounted. The rebound member is composed of, as illustrated in FIG. 2, a coil spring S4 fitted in an outer periphery of the nut portion 4h of the center rod 4b and having one end supported by the seat portion 4i and an annular spring guide 41 fitted in the other end of the coil spring S4.

The spring guide 41 is provided movably in an axial direction along an outer periphery of the shaft member 4a. When the hydraulic shock absorber S extends to the most, the spring guide 41 is brought into contact with the stopper 33, the coil spring S4 is compressed, and a predetermined reaction force is generated. As a result, the impact when the hydraulic shock absorber S extends to the most can be absorbed.

Moreover, when the second injection portion 4f is faced with the seal member C1, the spring guide 41 is also faced with the second injection portion 4f. A gap is formed between an inner periphery of the spring guide 41 and the piston rod 4. As a result, even when the spring guide 41 is brought into contact with the stopper 33, the inside and the outside of the cylinder 3 communicate with each other by a gap formed between the seal member C1 and the piston rod 4.

The piston 6 is formed annularly, and as illustrated in FIG. 1, it is fixed to an outer periphery of the holding portion 4j of the center rod 4b by a nut 60. In the piston 6, extension-side and compression-side piston passages (only the extension-side piston passage 6a is illustrated, while the compression-side piston passage is not shown) allowing the extension-side chamber p1 and the compression-side chamber p2 to communicate with each other are formed.

Moreover, on the piston 6, an extension-side damping valve 61 which closes an outlet of the extension-side piston passage 6a, capable of opening/closing and allows only a flow of the operating oil moving from the extension-side chamber p1 to the compression-side chamber p2 and prevents a flow in an opposite direction and a compression-side check valve 62 which closes an outlet of the compression-side piston passage, capable of opening/closing and allows only the flow of the operating oil moving through the compression-side piston passage from the compression-side chamber p2 to the extension-side chamber p1 and prevents the flow in the opposite direction are stacked.

The base rod 7 standing on the shaft core part on the side opposite to the piston rod 4 of the cylinder 3 is held in a state standing on the bottom member 32. The bottom member 32 is screwed with an outer periphery of the large inner-diameter portion 3b of the cylinder 3.

The base member 8 is fixed to a distal end portion of the base rod 7 by a nut 80. In the base member 8, extension-side and compression-side base passages (only the extension-side base passage 8a is illustrated, while the compression-side base passage is not shown) allowing the compression-side chamber p2 and the liquid reservoir chamber p3 to communicate with each other are formed.

Moreover, in the base member 8, an extension-side check valve 81 which closes an outlet of the extension-side base passage 8a, capable of opening/closing and allows only the flow of the operating oil moving through the extension-side base passage 8a from the liquid reservoir chamber p3 to the compression-side chamber p2 and prevents the flow in the opposite direction and a compression-side damping valve 82 which closes an outlet of the compression-side base passage, not shown, capable of opening/closing and allows only the flow of the operating oil moving through the compression-side base passage from the compression-side chamber p2 to the liquid reservoir chamber p3 and prevents the flow in the opposite direction are stacked.

The free piston 5 is formed annularly and is provided movably in the axial direction in the cylinder 3 in sliding contact with an outer peripheral surface of the base rod 7 and the inner peripheral surface of the cylinder 3. The free piston 5 includes an inner peripheral seal 5a made of an annular O-ring in sliding contact with the outer peripheral surface of the base rod 7 and an outer peripheral seal 5b made of an annular O-ring in sliding contact with the inner peripheral surface of the cylinder 1, closes the wheel side of the liquid chamber P and defines the liquid reservoir chamber p3 from the rear surface chamber Q.

When the free piston 5 moves to the lower side in FIG. 1 by a predetermined amount and the outer peripheral seal 5b reaches the large inner-diameter portion 3b of the cylinder 1, a gap is generated between the outer peripheral seal 5b and the cylinder 1. As a result, the operating oil in the liquid reservoir chamber p3 can be made to escape to the reservoir R through the gap and the communication hole 3c of the cylinder 3.

The urging means S1 for urging the free piston 5 to the upper side in FIG. 1 is made of a coil spring in this embodiment. The urging means S1 is accommodated in the rear surface camber Q and is interposed in a compressed state between the bottom member 32 and the free piston 5. The urging means S1 pressurizes the liquid chamber P through the free piston 5 and makes responsiveness of damping force generation in the hydraulic shock absorber S favorable.

Subsequently, an operating oil injecting method in assembling of the hydraulic shock absorber S will be explained by referring to FIG. 3.

Figure 3:
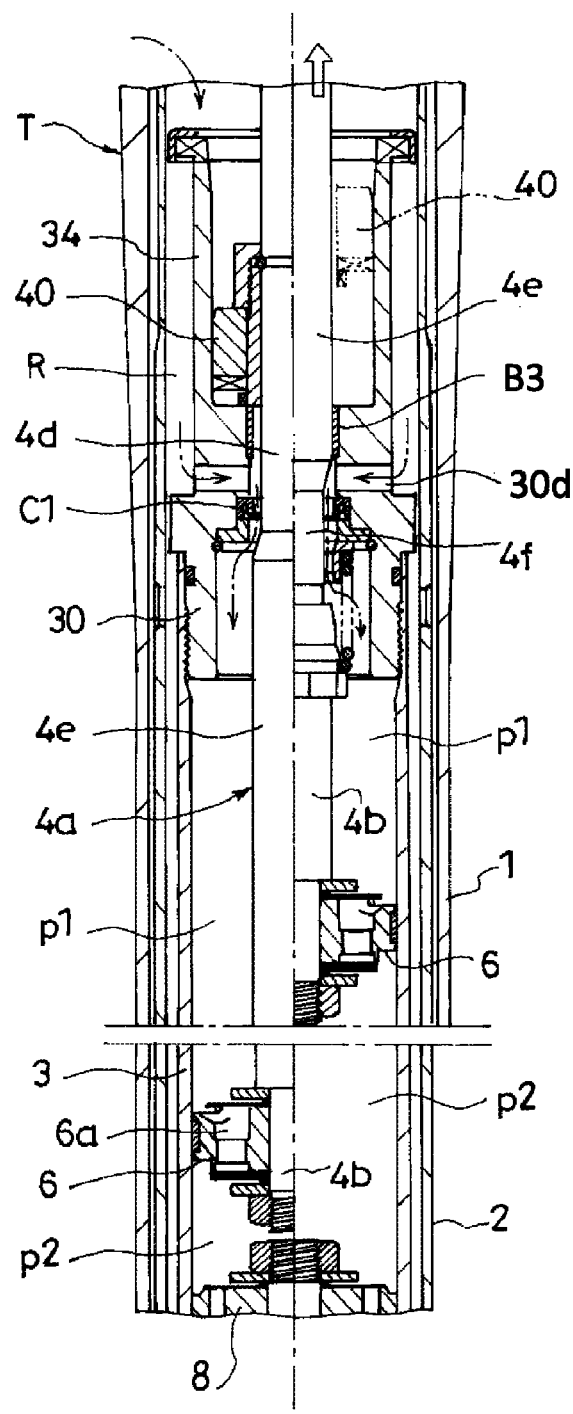
FIG. 3 is a view for explaining an operating-liquid injection process of the hydraulic shock absorber according to the embodiment of the present invention.

The left side from the center line in FIG. 3 illustrates an operating oil injecting process from the first injection portion, while the right side from the center line illustrates the operating oil injecting process from the second injection portion.

First, in a state in which the cap member 10 and the suspension spring S2 are not attached, as illustrated in FIG. 3 (on the left hand side), the piston rod 4 is inserted into the cylinder 3 until the first injection portion 4d is faced with the seal member C1 of the rod guide 30 and the operating oil is injected from an opening on the vehicle body side of the body T. At this time, since a gap is formed between the first injection portion 4d and the seal member C1, the operation oil injected into the reservoir R flows into the extension-side chamber p1 through the lateral hole 30d of the rod guide 30 and the gap.

After the extension-side chamber p1 is filled with the operating oil, by retreating the piston rod 4 from the cylinder 3, the sliding shaft portion 4e is faced with the seal member C1 of the rod guide 30. As a result, a gap between the piston rod 4 and the seal member C1 is closed, and the operating oil in the extension-side chamber p1 pressurized by the piston 6 passes through the piston passage 6a and moves to the compression-side chamber p2.

At this time, inside the cylinder 3, the operating oil runs short for a portion of a volume of the retreated piston rod 4 and a pressure becomes negative. Then, as illustrated in FIG. 3 (right hand side), when the piston rod 4 is retreated so that the second injection portion 4f is faced with the seal member C1, a gap is formed between the second injection portion 4f and the seal member C1, the operating oil in the reservoir R flows into the extension-side chamber p1 through the lateral hole 30d of the rod guide 30 and the gap, and the negative pressure in the cylinder 3 is solved.

In operation of the hydraulic shock absorber S after assembling is completed, the oil lock case 34 is filled with the operating oil therein. Thus, in the maximum compression of the hydraulic shock absorber S in which the oil lock piece 40 is fitted in the oil lock case 34, the oil lock piece 40 is made immovable at a position indicated by a broken line in FIG. 3 (right hand side), and a stroke in a compression direction is regulated.

Subsequently, an operation of the hydraulic shock absorber S will be explained.

First, extension of the hydraulic shock absorber S in which the inner tube 2 retreats from the outer tube 1 and the piston rod 4 retreats from the cylinder 3 will be explained.

If the seal member C1 of the rod guide 30 is faced with the sliding shaft portion 4e of the piston rod 4, the operating oil in the extension-side chamber p1 pressurized by the piston 6 passes through the piston passage 6a on the extension side and the bypass path 4k and moves to the compression-side chamber p2, and the operating oil for a portion of the volume of the piston rod 4 having retreated from the cylinder 3 passes through the base passage 8a on the extension side and moves from the liquid reservoir chamber p3 to the compression-side chamber p2. As a result, the hydraulic shock absorber S generates an extension-side damping force caused by resistance of the extension-side damping valve 61, the needle valve 15, and the extension-side check valve 81.

Since a valve opening pressure of the extension-side check valve 81 is set low, the above-described extension-side damping force is generated by resistance mainly of the extension-side damping valve 61 and the needle valve 15. The resistance by the needle valve 15 can be adjusted by the adjuster 13 for adjusting a damping force. Therefore, the extension-side damping force can be adjusted by the adjuster 13. Moreover, in this case, the free piston 5 moves to the upper side in FIG. 1, and the liquid reservoir chamber p3 contracts, while the rear surface chamber Q enlarges. As a result, the operating oil in the reservoir R moves to the rear surface chamber Q through the communication hole 3c of the cylinder 3.

Moreover, in extension of the hydraulic shock absorber S, when the piston rod 4 retreats from the cylinder 3 by a predetermined amount, the second injection portion 4f is faced with the seal member C1. Therefore, a gap is formed between the piston rod 4 and the seal member C1, and the operating oil in the extension-side chamber p1 moves to the reservoir R through the gap and the lateral hole 30d of the rod guide 30.

A gas remaining in the liquid chamber P during injection of the operating oil and air bubbles precipitated from the gas having been dissolved in the operating oil move to the upper side in the liquid chamber P and gather in the extension-side chamber p1. Therefore, the gas can be discharged to the outside of the cylinder 3 together with the operating oil from the gap and the lateral hole 30d, and a delay in generation of the extension-side damping force can be suppressed from occurring.

When the extension-side chamber p1 and the reservoir R communicate with each other, the pressure of the extension-side chamber p1 becomes a reservoir pressure, and the extension-side damping force runs short, but since the coil spring S4 of the rebound member is compressed so as to generate a reaction force, the extension-side damping force can be compensated for. Moreover, in this embodiment, in parking of the vehicle when the occupant gets off the vehicle and only a vehicle body load is applied to the hydraulic shock absorber S, the operating oil in the cylinder 3 is made to escape (relieved) to the outside of the cylinder 3 by the second injection portion 4f and thus, an internal pressure of the cylinder 3 can be reset each time the vehicle is parked.

Subsequently, compression of the hydraulic shock absorber S in which the inner tube 2 enters into the outer tube 1, and the piston rod 4 enters into the cylinder 3 will be explained.

In compression of the hydraulic shock absorber S, the operating oil in the compression-side chamber p2 pressurized by the piston 6 passes through the compression-side piston passage (not shown) and the bypass path 4k and moves to the extension-side chamber p1, and the operating oil for a portion of the volume of the piston rod 4 entering into the cylinder 3 passes through the compression-side base passage (not shown) and moves from the compression-side chamber p2 to the liquid reservoir chamber p3. As a result, the hydraulic shock absorber S generates a compression-side damping force caused by resistance of the compression-side check valve 62, the needle valve 15, and the compression-side damping valve 82.

Since the valve opening pressure of the compression-side check valve 62 is set low, the above-described compression-side damping force is generated by resistance mainly of the compression-side damping valve 82. In this case, the free piston 5 moves to the lower side in FIG. 1 and the liquid reservoir chamber p3 enlarges, while the rear surface chamber Q contracts. Therefore, the operating oil in the rear surface chamber Q moves to the reservoir R through the communication hole 3c of the cylinder 3.

Moreover, in a state in which the operating oil is repeatedly drawn into the cylinder 3 in entry of the piston rod 4 and the operating oil in the cylinder 3 increases or the volume of the operating oil expands due to a temperature rise, if an entry amount of the piston rod 4 into the cylinder 3 increases, the free piston 5 moves largely to the lower side in FIG. 1, and the outer peripheral seal 5b of the free piston 5 is faced with the large inner-diameter portion 3b of the cylinder 3. As a result, a gap is generated between the outer peripheral seal 5b and the cylinder 3, and the operating oil in the liquid reservoir chamber p3 moves to the reservoir R through the gap and the communication hole 3c of the cylinder 3. Therefore, an excessive rise of the internal pressure of the cylinder 3 can be suppressed.

A working effect of the hydraulic shock absorber S of this embodiment will be explained below.

In this embodiment, the first injection portion 4d and the second injection portion 4f are formed having the respective outer diameters smaller than the outer diameter of the sliding shaft portion 4e and include slope portions a1 and a2 with diameters gradually reduced from an end portion of the sliding shaft portion 4e side to the side opposite to the sliding shaft portion 4e.

According to the above-described configuration, since a gap formed between the outer peripheries of the first injection portion 4d or the second injection portion 4f and the seal member C1 of the rod guide 30 becomes annular, the operating oil injection work can be made quick by widening the gap and working for providing the first and second injection portions 4d and 4f on the piston rod 4 can be facilitated.

Moreover, as in this embodiment, if the lateral hole 30d is formed in the rod guide 30, and the operating oil is injected into the cylinder 3 through the lateral hole 30d, alignment in a circumferential direction of the lateral hole 30d and the first and second injection portions 4d and 4f is not necessary, and the injection work of the operating oil is facilitated.

Moreover, in this embodiment, since the second injection portion 4f is faced with the seal member C1 also in the operation of the hydraulic shock absorber S in some cases, the seal member C1 can be protected by providing the slope portion a2.

Figure 4A:
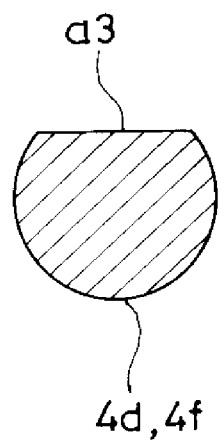
FIG. 4a is a view illustrating a variation of a first injection portion and a second injection portion of the hydraulic shock absorber.
Figure 4B:
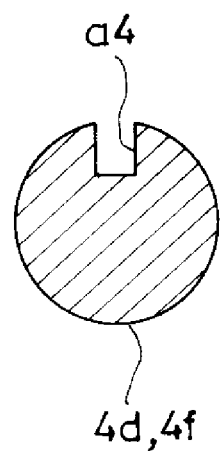
FIG. 4b is a view illustrating another variation of a first injection portion and a second injection portion of the hydraulic shock absorber.

The configurations of the first injection portion 4d and the second injection portion 4f are not limited to the above but as illustrated in FIGS. 4a and 4b, for example, a plane portion a3 or a groove a4 may be formed along the axial direction on the outer peripheries of the first injection portion 4d and the second injection portion 4f so that the operating oil is injected into the cylinder 3 from the gap between the plane portion a3 or the groove a4 and the seal member C1. Moreover, either one of the first and second injection portions 4d and 4f may include the slope portions a1 and a2.

Moreover, in this embodiment, the piston rod 4 is provided on the side opposite to the sliding shaft portion 4e of the first injection portion 4d and includes the mounting portion 4c on the outer periphery on which the oil lock piece 40 is mounted. Moreover, the rod guide 30 includes the insertion portion 30a inserted into the cylinder 3 and the protrusion portion 30b continuing to the insertion portion 30a and protruding from the cylinder 3. On the rod guide 30, the cylindrical oil lock case 34 into which the oil lock piece 40 is fitted in the most contraction of the hydraulic shock absorber S stands, and the lateral hole 30d penetrating the protrusion portion 30b in the radial direction and opened between the bush B3 of the rod guide 30 and the seal member C1 is formed.

According to the above-described configuration, as illustrated in FIG. 3 (left hand side), even if the gap formed between the first injection portion 4d and the bush B3 is closed by the oil lock piece 40, the operating oil can be injected into the cylinder 3 through the lateral hole 30d and the gap formed between the first injection portion 4d and the seal member C1. If the operating oil can be injected into the cylinder 3 through between the first injection portion 4d and the bush B3, the lateral hole 30d does not have to be formed, and the configuration of the rod guide 30 can be changed as appropriate.

Moreover, in this embodiment, the hydraulic shock absorber S includes the free piston 5 in sliding contact with the inner peripheral surface of the cylinder 3 and closing the wheel side of the liquid chamber P and the annular seal member C1 held on the cylinder 3 side which is closer to the lower sides in FIGS. 1 to 3 than the bush B3 on the inner periphery of the rod guide 30 and in sliding contact with the outer peripheral surface of the sliding shaft portion 4e. The piston rod 4 stands on the vehicle body side of the piston 6 and includes the second injection portion 4f for injecting the operating oil, provided on the piston 6 side of the sliding shaft portion 4e.

According to the above-described configuration, the first injection portion 4d is faced with the seal member C1, and the operating oil is injected into the cylinder 3 from the gap formed between the first injection portion 4d and the seal member C1 and then, the piston rod 4 is retreated from the cylinder 3, the second injection portion 4f is faced with the seal member C1, and the operating oil can be injected into the cylinder 3 through the gap formed between the second injection portion 4f and the seal member C1. Therefore, the operating oil can be easily filled in the extension-side chamber p1 and the compression-side chamber p2.

That is, by providing the above-described configuration, even if the operating oil cannot be injected into the liquid chamber P from the wheel side due to the presence of the free piston 5, the operating oil can be filled in the extension-side chamber p1 and the compression-side chamber p2 from the vehicle body side. Therefore, there is no need to inject the operating oil into the cylinder 3 and then, to mount it on the body T or to close the wheel side of the liquid chamber P after injecting the operating oil into the cylinder 3, and an increase in the number of components or the number of assembling processes can be suppressed.

If the hydraulic shock absorber S is not provided with the free piston 5, and the reservoir R and the compression-side chamber p2 can be made to communicate with each other by the base passage 8a of the base member 8, the operating oil can be injected into the cylinder 3 through the base passage 8a of the base member 8 without providing the second injection portion 4f. In such a case, only the first injection portion 4d may be provided. Moreover, in this embodiment, the hydraulic shock absorber S is set to the single rod type but it may be set to a double rod type by providing the piston rods 4 standing on both the vehicle body side and the wheel side of the piston 6.

Moreover, since the gas remaining in the liquid chamber P during injection of the operating oil and air bubbles precipitated from the gas having been dissolved in the operating oil move to the upper side in the liquid chamber P, the gas gathers on the upper end of the extension-side chamber p1 located on an upper end of the liquid chamber P if the hydraulic shock absorber S is set to the upright type. According to the above-described configuration, by providing the second injection portion 4f, the operating oil in the cylinder 3 can be made to escape (relieved) to the outside of the cylinder 3 from the rod guide 30 side (upper sides in FIGS. 1 to 3) in the operation of the hydraulic shock absorber S. Therefore, the gas remaining in the extension-side chamber p1 can be discharged together with the operating oil in relief, and a delay in generation of the extension-side damping force can be suppressed. Moreover, according to the above-described configuration, by urging the free piston 5 to the liquid chamber side, the liquid chamber P is pressurized and responsiveness of damping force generation can be made favorable.

Moreover, in this embodiment, the hydraulic shock absorber S is interposed between the vehicle body and the wheel and includes the cylinder 3 connected to the wheel side, the liquid chamber P formed in the cylinder 3 and filled with the operating oil, the annular rod guide 30 fixed to the cylinder 3 and closing the vehicle body side of the liquid chamber P, the piston rod 4 connected to the vehicle body side, penetrating the shaft core part of the rod guide 30 and going into/out of the cylinder 3, the piston 6 held by the piston rod 4 and dividing the liquid chamber P into the extension-side chamber p1 and the compression-side chamber p2, and the annular bush B3 fitted in the inner periphery of the rod guide 30 and pivotally supporting the piston rod 4, movably in the axial direction. The piston rod 4 includes the columnar sliding shaft portion 4e in sliding contact with the bush B3 and the first injection portion 4d for injecting the operating oil, provided outside the damper stroke range A on the side opposite to the piston 6 of the sliding shaft portion 4e.

According to the above-described configuration, in assembling the hydraulic shock absorber S, by facing the first injection portion 4d with the bush B3 or the seal member C1, the operating oil can be injected into the cylinder 3 from between the bush B3 and the first injection portion 4d or from between the seal member C1 and the first injection portion 4d. Therefore, even if the hydraulic shock absorber S is set to the upright type, the operating oil can be easily injected into the cylinder 3 after assembling the cylinder 3 to the body T.

Embodiments of the present invention were described above, but the above embodiments are merely examples of applications of the present invention, and the technical scope of the present invention is not limited to the specific constitutions of the above embodiments.

With respect to the above description, the contents of application No. 2013-068445, with a filing date of Mar. 28, 2013 in Japan, are incorporated herein by reference.

The invention claimed is:

1. A hydraulic shock absorber interposed between a vehicle body and a wheel, comprising:
a cylinder connected to the wheel side;
a liquid chamber formed in the cylinder, the liquid chamber being filled with an operating liquid;
an annular rod guide fixed to the cylinder, the rod guide closing the vehicle body side of the liquid chamber;
a piston rod connected to the vehicle body side, the piston rod penetrating a shaft core part of the rod guide, the piston rod going into/out of the cylinder;
a piston held by the piston rod, the piston dividing the liquid chamber into an extension-side chamber and a compression-side chamber; and
an annular bush fitted in an inner periphery of the rod guide, the bush pivotally supporting the piston rod movably in an axial direction, wherein
the piston rod includes:
a columnar sliding shaft portion contacting slidably with the bush; and
a first injection portion configured to inject the operating liquid, the first injection portion being provided on a side opposite to the piston of the sliding shaft portion and outside a range of a damper stroke.

2. The hydraulic shock absorber according to claim 1, further comprising:
a free piston contacting slidably with an inner peripheral surface of the cylinder, the free piston closing the wheel side of the liquid chamber; and
an annular seal member held on an inner periphery of the rod guide closer to the cylinder side than the bush, the seal member contacting slidably with an outer peripheral surface of the sliding shaft portion, wherein
the piston rod stands on the vehicle body side of the piston, the piston rod including a second injection portion configured to inject the operating liquid, the second injection portion being provided on the piston side of the sliding shaft portion.

3. The hydraulic shock absorber according to claim 2, wherein
the piston rod includes a mounting portion on which an oil lock piece is mounted on an outer periphery thereof, the mounting portion being provided on a side opposite to the sliding shaft portion of the first injection portion;
the rod guide includes:
an insertion portion inserted into the cylinder; and
a protrusion portion protruding from the cylinder, the protrusion portion continuing to the insertion portion; and
in the rod guide, a cylindrical oil lock case stands, in which the oil lock piece is fitted in a most contraction, and a lateral hole is formed, the lateral hole penetrating the protrusion portion in a radial direction, the lateral hole opening between the bush and the seal member.

4. The hydraulic shock absorber according to claim 2, wherein
either one of or both of the first injection portion and the second injection portion includes slope portions with diameters gradually reduced from an end portion of the sliding shaft portion side to a side opposite to the sliding shaft portion, the slope portions being formed having outer diameters smaller than an outer diameter of the sliding shaft portion.

5. A method for injecting an operating liquid to a hydraulic shock absorber, the hydraulic shock absorber being interposed between a vehicle body and a wheel, the hydraulic shock absorber comprising:
a cylinder connected to the wheel side;
a liquid chamber formed in the cylinder, the liquid chamber being filled with an operating liquid;
an annular rod guide fixed to the cylinder, the rod guide closing the vehicle body side of the liquid chamber;
a piston rod connected to the vehicle body side, the piston rod penetrating a shaft core part of the rod guide, the piston rod going into/out of the cylinder;
a piston held by the piston rod, the piston dividing the liquid chamber into an extension-side chamber and a compression-side chamber;
an annular bush fitted in an inner periphery of the rod guide, the bush pivotally supporting the piston rod movably in an axial direction;
a free piston contacting slidably with an inner peripheral surface of the cylinder, the free piston closing the wheel side of the liquid chamber; and
an annular seal member held on an inner periphery of the rod guide closer to the cylinder side than the bush, the seal member contacting slidably with an outer peripheral surface of a columnar sliding shaft portion of the piston rod, the columnar sliding shaft portion contacting slidably with the bush, wherein
the piston rod stands on the vehicle body side of the piston, and the piston rod includes:
a first injection portion configured to inject the operating liquid, the first injection portion being provided on a side opposite to the piston of the sliding shaft portion and outside a range of a damper stroke; and
a second injection portion configured to inject the operating liquid, the second injection portion being provided on the piston side of the sliding shaft portion; wherein
after the operating liquid is injected into the cylinder through a gap formed between the first injection portion and the seal member by facing the first injection portion with the seal member, the piston rod is retracted from the cylinder, and the operating liquid is injected into the cylinder through a gap formed between the second injection portion and the seal member by facing the second injection portion with the seal member.

* * * * *